(No Model.)
K. M. DEAN.
REIN SUPPORT.
No. 472,013. Patented Mar. 29, 1892.
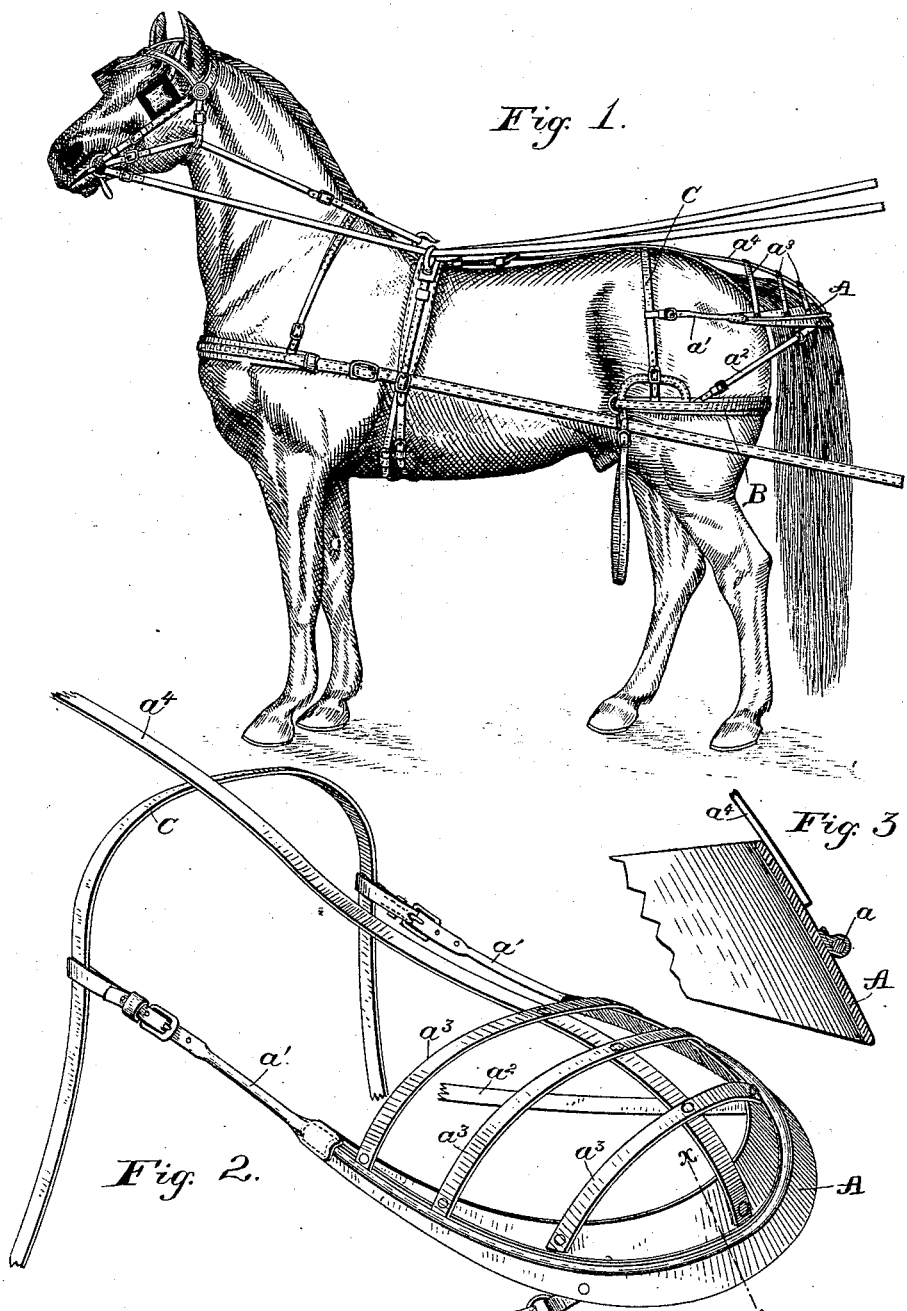
Witnesses:
Percy C. Bowen
J. E. Wilson
Inventor:
Kate M. Dean
By Whitman + Wilkinson
Attorneys.

UNITED STATES PATENT OFFICE.

KATE M. DEAN, OF MEMPHIS, TENNESSEE, ASSIGNOR OF ONE-THIRD TO ADDISON H. DOUGLASS, OF SAME PLACE.

REIN-SUPPORT.

SPECIFICATION forming part of Letters Patent No. 472,013, dated March 29, 1892.

Application filed December 15, 1891. Serial No. 415,187. (No model.)

*To all whom it may concern:*

Be it known that I, KATE M. DEAN, a citizen of the United States, residing at Memphis, in the county of Shelby and State of Tennessee, have invented certain new and useful Improvements in Devices to Prevent the Driving-Reins from Being Caught Under Horses' Tails; and I do hereby declare the following to be a full, clear, and exact description of the invention, such as will enable others skilled in the art to which it appertains to make and use the same.

My invention relates to devices for preventing the driving-reins from being caught under the tail of the horse; and it consists of a species of bustle adapted to be fastened over the root of the tail and to extend a short distance downward, allowing the tail to be moved freely, but preventing the horse from throwing it up over the reins.

Reference is had to the accompanying drawings, wherein the same parts are indicated by the same letters.

Figure 1 represents a horse and harness, illustrating my invention. Fig. 2 represents a perspective view of the device, and Fig. 3 represents a section of Fig. 2 along the line $x$ $x$.

The device consists of a broad strap A, preferably stiffened with a steel wire $a$, as shown in Fig. 3, which strap is secured to the breeching-support C and breeching B by straps $a'$ and $a^2$; or they may be secured to the traces and the saddle where no breeching is used. The broad strap A is supported in the proper position by three or more or less cross-straps $a^3$ and by the longitudinal strap $a^4$, running forward to the saddle.

Having thus described my invention, what I claim, and desire to secure by Letters Patent of the United States, is—

A device for preventing a horse from throwing his tail over the reins, which consists of a strap A, stiffening-wire $a$, forward holding-straps $a'$ and $a^4$, downward holding or steadying straps $a^2$, and supporting-straps $a^3$, all substantially as and for the purposes described.

In testimony whereof I affix my signature in presence of two witnesses.

KATE M. DEAN.

Witnesses:
ANNA M. LEE,
R. R. DOUGLASS.